(12) United States Patent
Takahashi et al.

(10) Patent No.: US 10,760,516 B2
(45) Date of Patent: Sep. 1, 2020

(54) LEAKAGE DETECTION DEVICE

(71) Applicant: Fuji Jukogyo Kabushiki Kaisha, Tokyo (JP)

(72) Inventors: Daisuke Takahashi, Tokyo (JP); Daiki Shiwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 171 days.

(21) Appl. No.: 15/390,184

(22) Filed: Dec. 23, 2016

(65) Prior Publication Data

US 2017/0268448 A1    Sep. 21, 2017

(30) Foreign Application Priority Data

Mar. 17, 2016  (JP) ................................ 2016-054526

(51) Int. Cl.
*F02B 25/06*    (2006.01)
*F02D 41/22*    (2006.01)
(Continued)

(52) U.S. Cl.
CPC ........... *F02D 41/22* (2013.01); *F01M 13/023* (2013.01); *F02M 25/06* (2013.01);
(Continued)

(58) Field of Classification Search
CPC ....... F02D 41/22; F02D 19/025; F01M 13/00; F01M 13/023
(Continued)

(56) References Cited

U.S. PATENT DOCUMENTS 3,949,719 A  *  4/1976  Bellanca .............. F01M 13/023
                                                    123/574
5,499,616 A  *  3/1996  Enright ................ F01M 13/022
                                                    123/572
(Continued)

FOREIGN PATENT DOCUMENTS

JP      2010-090810 A      4/2010
JP      2010-096029 A      4/2010
(Continued)

OTHER PUBLICATIONS

Japanese Office Action dated Jul. 4, 2017 in Japanese Application No. 2016-054526, with an English translation thereof.
(Continued)

*Primary Examiner* — Long T Tran
*Assistant Examiner* — James J Kim
(74) *Attorney, Agent, or Firm* — McGinn IP Law Group, PLLC (57) ABSTRACT

A leakage detection device detects leakage in a PCV passage that at least includes a scavenging line that communicates between a crank chamber of an engine and a portion of an intake passage of the engine that is on a downstream side of a throttle valve and a fresh air line that communicates between the crank chamber and a portion of the intake passage that is on an upstream side of the throttle valve. The leakage detection device includes a pressure measurement, a first valve and a leakage determination unit. The pressure measurement unit measures pressure in the PCV passage. The first valve opens/closes the fresh air line. The leakage determination unit determines presence or absence of leakage in the PCV passage on a basis of the pressure in the PCV passage at a time when the first valve is closed.

20 Claims, 5 Drawing Sheets

(51) Int. Cl.
*F01M 13/02* (2006.01)
*F02M 25/06* (2016.01)

(52) U.S. Cl.
CPC .................. *F01M 2013/027* (2013.01); *F02D 2200/0406* (2013.01); *F02D 2250/08* (2013.01); *Y02T 10/121* (2013.01)

(58) Field of Classification Search
USPC ........................................................ 123/574
See application file for complete search history.

(56) References Cited

U.S. PATENT DOCUMENTS

| | | | |
|---|---|---|---|
| 5,792,949 A | 8/1998 | Hewelt | |
| 5,881,686 A * | 3/1999 | Schmidt | F01M 13/023 123/41.86 |
| 2005/0022795 A1 | 2/2005 | Beyer | |
| 2010/0139585 A1 * | 6/2010 | Frazier, Jr. | F01M 13/0011 123/41.86 |
| 2010/0147270 A1 | 6/2010 | Pursifull | |
| 2011/0197864 A1 | 8/2011 | Karcher | |
| 2013/0282255 A1 * | 10/2013 | Pursifull | F01M 11/12 701/102 |
| 2014/0081549 A1 | 3/2014 | Rollinger | |
| 2014/0081550 A1 * | 3/2014 | Jentz | F01M 1/18 701/101 |
| 2014/0081564 A1 * | 3/2014 | Pursifull | G01M 15/08 701/113 |
| 2015/0167591 A1 * | 6/2015 | Sato | F01M 13/0011 123/403 |
| 2016/0097354 A1 * | 4/2016 | Martus | F01M 11/00 123/572 |
| 2016/0097355 A1 | 4/2016 | Jentz | |
| 2016/0265404 A1 | 9/2016 | Fujii | |
| 2016/0326990 A1 * | 11/2016 | Pursifull | F02D 41/0032 |
| 2017/0002761 A1 | 1/2017 | Dudar | |
| 2017/0145962 A1 * | 5/2017 | Dudar | F02M 25/0836 |
| 2017/0335739 A1 | 11/2017 | Noguchi | |

FOREIGN PATENT DOCUMENTS

| | | |
|---|---|---|
| JP | 2013-117176 A | 6/2013 |
| JP | 2014-058937 A | 4/2014 |

OTHER PUBLICATIONS

United States Office Action dated Jan. 2, 2019, in U.S. Appl. No. 15/864,719.
United States Office Action dated Apr. 15, 2019, in U.S. Appl. No. 15/864,719.

\* cited by examiner

LEAKAGE DETECTION DEVICE

CROSS-REFERENCE TO RELATED APPLICATIONS

The present application claims priority from Japanese Patent Application No. 2016-054526 filed on Mar. 17, 2016, the entire contents of which are hereby incorporated by reference.

BACKGROUND

1. Technical Field

The present invention relates to a leakage detection device for detecting leakage that occurs in a passage for constituting a PCV system of an engine.

2. Related Art

Conventionally, an engine includes a positive crankcase ventilation (PCV) system for guiding blow-by gas, which flows from a combustion chamber and is leaked into a crankcase through a gap between a cylinder and a piston, to an intake passage.

This PCV system returns the blow-by gas that contains nitrogen oxides (NOx), carbon monoxide (CO), hydrocarbons (HC), and the like to the intake passage of the engine via a blow-by gas passage and thereby prevents release of the blow-by gas to the atmosphere.

When leakage occurs in the blow-by gas passage, the blow-by gas is released to the atmosphere. Thus, the leakage in the blow-by gas passage has to be detected. In view of this, a technique of measuring pressure in the crankcase that communicates with the blow-by gas passage and detecting the leakage in the blow-by gas passage on the basis of this pressure has been suggested (for instance, Japanese Unexamined Patent Application Publication (JP-A) No. 2013-117176).

By the way, the PCV system of the engine includes passages that are coupled to the crankcase mainly for a purpose of processing the blow-by gas, such as a passage for introducing fresh air into the crankcase from the intake passage, in addition to the blow-by gas passage for returning the blow-by gas to the intake passage. Because the blow-by gas possibly flows into these passages, the leakage therein has to be detected in a similar manner to that in the blow-by gas passage. However, a method for comprehensively detecting the leakage that occurs in any of these passages for constituting the PCV system (hereinafter simply referred to as a PCV passage) has not been suggested.

SUMMARY OF THE INVENTION

It is desirable to provide a leakage detection device capable of comprehensively detecting leakage that occurs in a PCV passage of an engine.

An aspect of the present invention provides a leakage detection device that detects leakage in a PCV passage that at least includes a scavenging line that communicates between a crank chamber of an engine and a portion of an intake passage of the engine that is on a downstream side of a throttle valve and a fresh air line that communicates between the crank chamber and a portion of the intake passage that is on an upstream side of the throttle valve. The leakage detection device includes: a pressure measurement unit that measures pressure in the PCV passage; a first valve that opens/closes the fresh air line; and a leakage determination unit that determines presence or absence of the leakage in the PCV passage on a basis of the pressure in the PCV passage at a time when the first valve is closed.

The first valve may be provided at an end of the fresh air line on a side that is coupled to the intake passage.

A second valve capable of adjusting a flow rate of blow-by gas that to be delivered from the crank chamber to the scavenging line may further be provided.

A valve control unit that controls an opening degree of the second valve may be provided, and the valve control unit may control the opening degree of the second valve on a basis of the pressure measured by the pressure measurement unit.

A valve control unit that controls an opening degree of the second valve and an intake manifold pressure measurement unit that measures pressure in an intake manifold of the engine may be provided, and the valve control unit may control the opening degree of the second valve on a basis of the pressure measured by the intake manifold pressure measurement unit.

The leakage determination unit may determine that the leakage occurs in the PCV passage in the cases where the portion of the intake passage that is on the downstream side of the throttle valve has negative pressure and the pressure in the PCV passage does not become at most equal to a specified threshold value even after a lapse of specified time from closing of the first valve.

A compressor that supercharging air that flows into the intake passage may further be provided on a downstream side of a portion of the intake passage that communicates with the fresh air line and on an upstream side of the throttle valve. The first valve may be closed after the air, which flows into the intake passage, is supercharged by the compressor, and the leakage determination unit may determine that the leakage occurs in the PCV passage when the pressure in the PCV passage becomes at most equal to a specified threshold value at a time point at which specified time elapses from closing of the first valve.

DETAILED DESCRIPTION

A detailed description will hereinafter be made on a preferred implementation of the present invention with reference to the accompanying drawings. Dimensions, materials, other specific numerical values, and the like described in such an implementation are merely illustrative to facilitate understanding of the invention and thus do not limit the present invention unless otherwise particularly noted. Note that, in this specification and the drawings, an overlapping description will not be made on elements that have substantially the same function or configuration and will be denoted by the same reference sign. In addition, elements that are not directly related to the present invention will not be illustrated.

Figure 1:
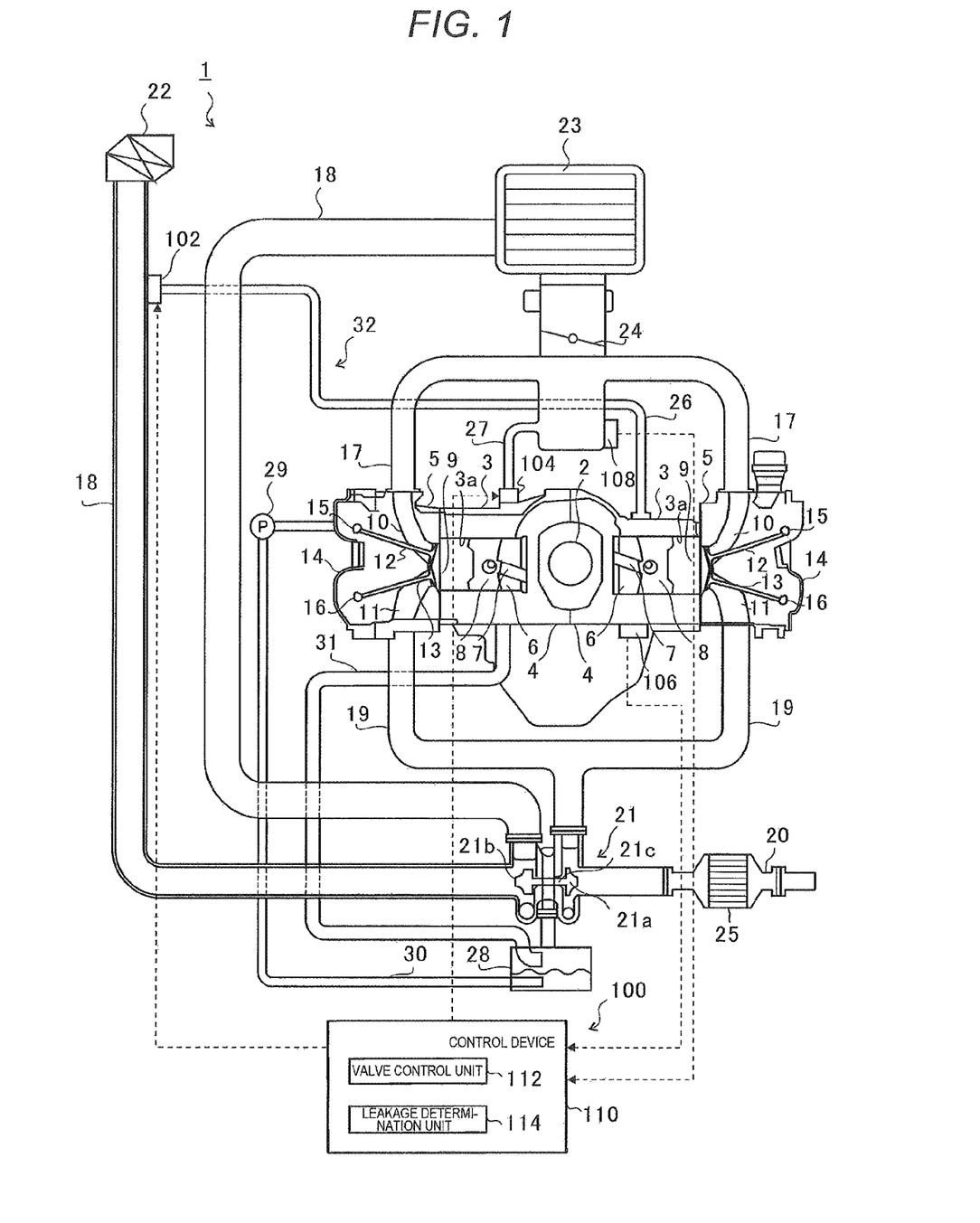
FIG. 1 is a schematic view of an engine that includes a leakage detection device.

FIG. 1 is a schematic view of an engine 1 that includes a leakage detection device 100 of the present invention. Initially, a schematic configuration of the engine 1 will be described. Then, a configuration of the leakage detection device 100 will be described.

As illustrated in FIG. 1, the engine 1 is a horizontally-opposed four-cylinder engine in which cylinder bores 3a respectively provided in two cylinder blocks 3 are disposed in a horizontally-opposed manner with a crankshaft 2 being interposed therebetween.

A crankcase 4 is integrally formed on the cylinder block 3, and a cylinder head 5 is fixed to an opposite side thereof from the crankcase 4. The crankshaft 2 is supported in a freely rotatable manner in a crank chamber 6 that is provided by the crankcase 4.

A piston 8 that is coupled to the crankshaft 2 via a connecting rod 7 is slidably accommodated in the cylinder bore 3a. In the engine 1, a space surrounded by the cylinder bore 3a, the cylinder head 5, and a crown surface of the piston 8 is provided as a combustion chamber 9.

The cylinder head 5 includes an intake port 10 and an exhaust port 11 such that each thereof communicates with the combustion chamber 9. A tip of an intake valve 12 is located at a position between the intake port 10 and the combustion chamber 9, and a tip of an exhaust valve 13 is located at a position between the exhaust port 11 and the combustion chamber 9.

In the engine 1, an intake valve cam 15 and an exhaust valve cam 16 are provided in a cam chamber that is surrounded by the cylinder head 5 and a head cover 14. The intake valve cam 15 abuts against the other end of the intake valve 12 and rotates to move the intake valve 12 in an axial direction. In this way, the intake valve 12 opens/closes the position between the intake port 10 and the combustion chamber 9. The exhaust valve cam 16 abuts against the other end of the exhaust valve 13 and rotates to move the exhaust valve 13 in the axial direction. In this way, the exhaust valve 13 opens/closes the position between the exhaust port 11 and the combustion chamber 9.

An intake passage 18 that includes an intake manifold 17 communicates with an upstream side of the intake port 10. An exhaust passage 20 that includes an exhaust manifold 19 communicates with a downstream side of the exhaust port 11. Exhaust gas that is discharged from the combustion chamber 9 of each cylinder is collected in the exhaust manifold 19 via the exhaust port 11 and is guided to a turbine 21a of a supercharger 21.

The supercharger 21 includes: the turbine 21a that rotates by the exhaust gas discharged from the exhaust manifold 19; and a compressor 21b that rotates by rotary power of the turbine 21a. The turbine 21a and the compressor 21b are coupled by a turbine shaft 21c and rotate integrally.

The intake passage 18 is sequentially provided with an air cleaner 22, the compressor 21b, an intercooler 23, and a throttle valve 24 from the upstream side. The compressor 21b compresses intake air, from which foreign substances such as dirt and dust are removed by the air cleaner 22, and supplies the intake air to the downstream side.

The intercooler 23 cools the intake air, a temperature of which is raised due to compression by the compressor 21b. The throttle valve 24 changes a flow rate of the intake air that is supplied to the combustion chamber 9 when an opening degree thereof is adjusted by an unillustrated actuator.

Then, air-fuel mixture that includes the intake air guided to the combustion chamber 9 and fuel injected from an unillustrated injector is ignited and combusted at specified timing by an unillustrated ignition plug that is provided in the cylinder head 5. Such combustion causes reciprocation of the piston 8 in the cylinder bore 3a, and the reciprocation is converted to rotational motion of the crankshaft 2 through the connecting rod 7. The exhaust gas that is generated by the combustion is guided to the turbine 21a via the exhaust port 11 and the exhaust manifold 19, causes rotation of the turbine 21a, is then purified by a catalyst 25 that is provided in the exhaust passage 20, and is discharged to the outside of a vehicle.

The engine 1 is also provided with a fresh air line 26 for communicating between the crank chamber 6 and a portion of the intake passage 18 that is between the air cleaner 22 and the compressor 21b. A leakage detection valve 102 (a first valve) for constituting the leakage detection device 100 of the present invention is provided at an end of the fresh air line 26 on a side that is coupled to the intake passage 18.

The engine 1 is further provided with a scavenging line 27 for communicating between the crank chamber 6, which is provided in the crankcase 4, and the intake manifold 17. A PCV valve 104 (a second valve) for constituting the leakage detection device 100 is provided in a coupled portion between the scavenging line 27 and the crank chamber 6. Note that the leakage detection valve 102 and the PCV valve 104 will be described below.

The fresh air line 26 and the scavenging line 27 are mainly provided to scavenge the blow-by gas in the crank chamber 6. The blow-by gas is a slight amount of semi-combusted gas in a half-way through combustion that is leaked from a gap between the piston 8 and the cylinder bore 3a into the crank chamber 6 due to a pressure increase in the combustion chamber 9 during a combustion stroke of the engine 1, and contains nitrogen oxides (NOx) and the like that are toxic substances. A direction in which the blow-by gas flows through each of the fresh air line 26 and the scavenging line 27 differs between an operating range of natural aspiration where the intake air is not supercharged and a range of a supercharging operation where the intake air is supercharged.

Figure 2A:
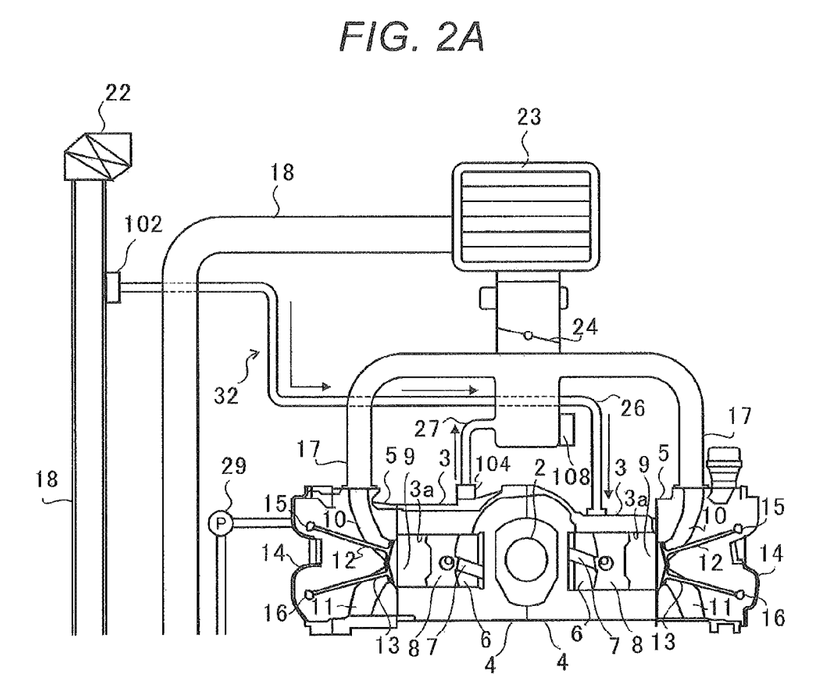
FIG. 2A is a view for illustrating flows of blow-by gas and fresh air in an operating range of natural aspiration.

FIG. 2A is a view for illustrating flows of the blow-by gas and fresh air in the operating range of the natural aspiration by solid arrows, and FIG. 2B is a view for illustrating a flow of the blow-by gas in the range of the supercharging operation by solid arrows. As illustrated in FIG. 2A, in the operating range of the natural aspiration, the leakage detection valve 102 and the PCV valve 104 of the engine 1 are opened. The blow-by gas in the crank chamber 6 is introduced from the scavenging line 27 into to the intake manifold 17 due to negative pressure that is generated in the intake manifold 17. In addition, the fresh air is introduced from the fresh air line 26 into the crank chamber 6.

Figure 2B:
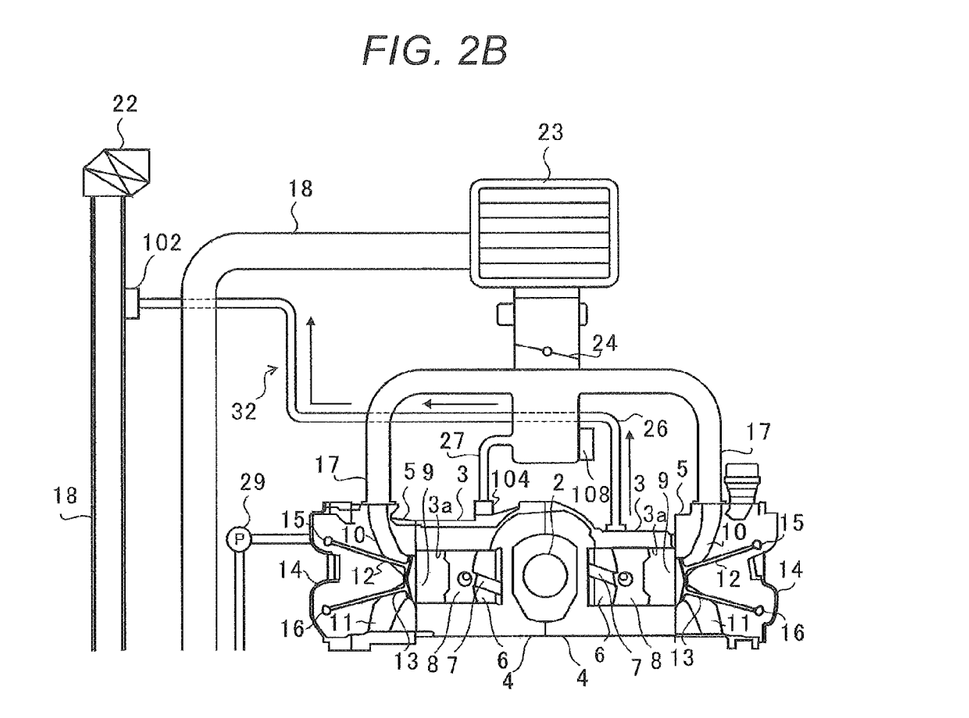
FIG. 2B is a view for illustrating a flow of the blow-by gas in a range of a supercharging operation.

Meanwhile, as illustrated in FIG. 2B, in the range of the supercharging operation, the leakage detection valve 102 of the engine 1 is opened, and the PCV valve 104 thereof is closed. The blow-by gas in the crank chamber 6 is suctioned from the fresh air line 26 and introduced into the intake passage 18 due to the negative pressure that is generated between the air cleaner 22 and the compressor 21b in the intake passage 18. At this time, airflow is not generated in the scavenging line 27.

Returning to FIG. 1, an oil catch tank 28 is provided below the supercharger 21. The oil catch tank 28 is coupled to the supercharger 21, which is located above, and temporarily reserves oil after lubricating the supercharger 21. The reserved oil is suctioned by a scavenging pump 29 and returned to an oil pan of the engine 1 via a suction line 30.

The oil catch tank 28 is coupled to the crank chamber 6, which is provided in the crankcase 4, by a balance line 31. The balance line 31 communicates between the crank chamber 6 and the oil catch tank 28 so as to retain pressure in the oil catch tank 28 to be equal to pressure in the crank chamber 6, and prevents generation of excess negative pressure in the oil catch tank 28, which is caused by suction of the oil by the scavenging pump 29.

Note that, together with the fresh air line 26 and the scavenging line 27, which are described above, the balance line 31 constitutes a PCV system of the engine 1. Passages that are centered on the crank chamber 6 and include the fresh air line 26, the scavenging line 27, and the balance line 31, which are coupled to the crank chamber 6, are collectively referred as a "PCV passage" (a reference sign 32 in FIG. 1) of the engine 1 herein.

(Leakage Detection Device 100)

The engine 1 is provided with the leakage detection device 100 for detecting leakage that occurs in the PCV passage 32. More specifically, the leakage detection device 100 detects the leakage that occurs in any of the fresh air line 26, the scavenging line 27, and the balance line 31, which constitute the PCV passage 32. The leakage detection device 100 is configured by including the above-described leakage detection valve 102, the PCV valve 104, a pressure sensor 106 (a pressure measurement unit), a pressure sensor 108 (an intake manifold pressure measurement unit), and a control device 110.

The leakage detection valve 102 is provided at the end of the fresh air line 26 on the side that is coupled to the intake passage 18, and opens/closes a passage of the fresh air line 26. The PCV valve 104 is constructed of an electronic control valve that can have any of plural intermediate opening degrees, and can adjust the flow rate of the blow-by gas that is delivered from the crank chamber 6 to the scavenging line 27 when the opening degree thereof is adjusted. The pressure sensor 106 is attached to the crankcase 4 and measures the pressure in the crank chamber 6, which is provided in the crankcase 4. The pressure sensor 108 is attached to the intake manifold 17 and measures the pressure in the intake manifold 17. The pressure sensors 106 and 108 are coupled to the control device 110 and respectively output detection signals corresponding to the pressure in the crank chamber 6 and the pressure in the intake manifold 17 to the control device 110.

The control device 110 is an engine control unit (ECU), for instance, and is a microcomputer that includes a central processing unit (CPU), a ROM that stores a program and the like, a RAM as a work area, a memory unit such as a flash memory, and the like. The control device 110 controls an overall operation of the engine 1 and also functions as a valve control unit 112 and a leakage determination unit 114 of the present invention.

In the case where the leakage detection valve 102 is closed when the engine 1 is driven by using the natural aspiration, a flow of the fresh air that is introduced from the intake passage 18 into the crank chamber 6 via the fresh airline 26 is blocked. Then, the pressure in the crank chamber 6 is influenced by the negative pressure that is generated in the intake manifold 17, and thereby becomes negative pressure. At this time, the opening degree of the PCV valve 104 is appropriately adjusted in accordance with the pressure (the negative pressure) in the intake manifold 17. In this way, pressure in the PCV passage 32 constructed of the fresh air line 26, the scavenging line 27, and the balance line 31, which are coupled to the crank chamber 6, becomes negative pressure. Note that adjustment of the opening degree of the PCV valve 104 will be described in detail below.

In the case where the leakage occurs in none of the lines for constituting the PCV passage 32 at this time, the negative pressure in the crank chamber 6 and the PCV passage 32 is gradually increased with a lapse of time. On the other hand, in the case where the leakage occurs in at least one of the lines for constituting the PCV passage 32, the air flows into the PCV passage 32 from a position of leakage. Thus, the negative pressure in the crank chamber 6 and the PCV passage 32 is not increased with the lapse of time.

The leakage detection device 100 uses such a characteristic and thereby determines that the leakage occurs in any of the lines for constituting the PCV passage 32 in the case where the pressure in the crank chamber 6 after a lapse of specified time from closing of the leakage detection valve 102 does not become at most equal to a threshold value (a negative pressure value). A description will hereinafter be made on a specific operation of the leakage detection device 100.

Initially, when the engine 1 is driven by using the natural aspiration, the valve control unit 112 controls to close the leakage detection valve 102 provided in the fresh air line 26. In this way, the flow of the fresh air that is introduced from the intake passage 18 into the crank chamber 6 via the fresh air line 26 is blocked. In addition, the valve control unit 112 adjusts the opening degree of the PCV valve 104 in accordance with the pressure in the intake manifold 17 after closing of the leakage detection valve 102 and thereby adjusts the flow rate of the blow-by gas that is delivered to the scavenging line 27.

Next, after the leakage detection valve 102 is closed, the pressure sensor 106 starts measuring the pressure in the crank chamber 6 and outputs the detection signal indicative of the measured pressure to the leakage determination unit 114.

The leakage determination unit 114 extracts pressure P1 in the crank chamber 6 that is obtained after a lapse of specified time (for instance, 10 seconds) from closing of the leakage detection valve 102. Then, the leakage determination unit 114 determines whether the pressure P1 in the crank chamber 6, which is obtained after the lapse of the specified time from closing of the leakage detection valve 102, is at most equal to a threshold value P2, which is set in advance.

A pressure value (negative pressure value) that is measured in the crank chamber 6 is set as the threshold value P2, the pressure value being measured at a time when at least the specified time elapses from closing of the leakage detection valve 102 in the case where the leakage does not occur in the PCV passage 32 of the engine 1. Any value can be set as a value of the threshold value P2. However, when a further strict determination of the leakage is desired, a smaller value may be set as the threshold value P2. The thus-set threshold value P2 is stored in the memory unit of the control device 110.

As a result, when the pressure P1 is at most equal to the threshold value P2, the leakage determination unit 114 determines that the leakage occurs in none of the lines for constituting the PCV passage 32. On the other hand, when the pressure 81 is not at most equal to the threshold value P2, that is, when the pressure P1 does not become at most equal to the threshold value P2 even after the lapse of the specified time from closing of the leakage detection valve 102, the leakage determination unit 114 determines that the leakage occurs in any of the lines for constituting the PCV passage 32.

As described above, the leakage detection device 100 closes the leakage detection valve 102 so as to block the flow of the fresh air, which is introduced into the crank chamber 6. In this way, the pressure in the crank chamber 6 becomes the negative pressure. Then, the pressure 81 in the crank chamber 6 at the time when the specified time elapses from closing of the leakage detection valve 102 is compared to the threshold value P2. In this way, the leakage that occurs in any of the lines for constituting the PCV passage 32 is comprehensively detected.

In this implementation, the leakage detection valve 102 is provided at the end of the fresh air line 26 on the side that is coupled to the intake passage 18. Accordingly, when the leakage occurs in the fresh air line 26, the air flows thereinto from the position of the leakage regardless of the position where the leakage occurs, and the pressure in the crank chamber 6 does not become at most equal to the threshold value P2 even when the specified time elapses from closing of the leakage detection valve 102. Thus, when the leakage occurs in the fresh air line 26, the leakage determination unit 114 can reliably determine occurrence of the leakage regardless of the position where the leakage occurs.

Note that a specified malfunction code is desirably stored in the memory unit of the control device 110. In this way, when the leakage determination unit 114 determines that the leakage occurs in any of the lines for constituting the PCV passage 32, a maintenance worker can recognize the occurrence of the leakage during maintenance.

As a precondition to the above leakage detection process, the pressure in the crank chamber 6 is set to be the negative pressure. Thus, it is concerned that introduction of the negative pressure leads to a change in an air-fuel ratio and/or occurrence of a shock to the engine, which influence drivability. For this reason, the leakage detection process is desirably performed in a travel range under a low load, for instance.

By the way, upon the above detection of the leakage, in the case where the negative pressure in the crank chamber 6 becomes excessively high after closing of the leakage detection valve 102, failure possibly occurs to a component of the engine, such as deformation of piping for constituting the PCV passage 32 that includes the fresh air line 26 and the like. In addition, an excess increase of the negative pressure in the crank chamber 6 possibly has an adverse influence on accuracy of the leakage detection.

In view of the above, in this implementation, in order to avoid introduction of such excess negative pressure into the crank chamber 6, the valve control unit 112 appropriately adjusts the opening degree of the PCV valve 104, which is provided in the scavenging line 27, in accordance with the pressure (the negative pressure) in the intake manifold 17, so as to adjust the flow rate of the blow-by gas delivered from the crank chamber 6 to the scavenging line 27.

More specifically, the valve control unit 112 receives the pressure in the intake manifold 17, which is obtained after closing of the leakage detection valve 102, from the pressure sensor 108. Then, in order to prevent the generation of the excess negative pressure in the crank chamber 6, the valve control unit 112 reduces the opening degree of the PCV valve 104 as the negative pressure in the intake manifold 17, which is received from the pressure sensor 108, is increased, and thereby reduces the flow rate of the blow-by gas delivered from the crank chamber 6 to the scavenging line 27. In this way, the leakage detection device 100 retains the flow rate of the blow-by gas, which is delivered to the scavenging line 27, to be constant. Thus, the leakage detection device 100 can detect the leakage while protecting the engine components.

Figure 3:
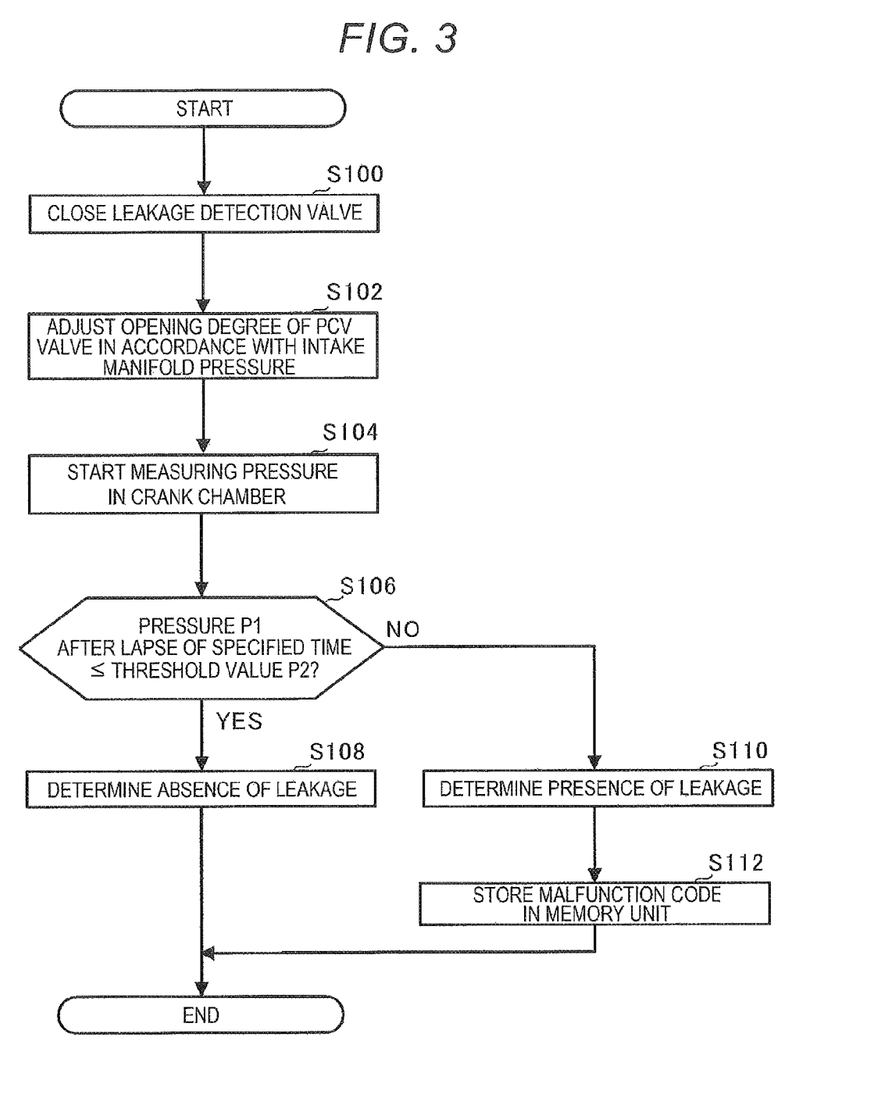
FIG. 3 is a flowchart for illustrating a flow of a leakage detection process.

Next, a description will be made on a flow of the leakage detection process in the PCV passage 32 by the leakage detection device 100 on the basis of a flowchart in FIG. 3.

Initially, the valve control unit 112 controls to close the leakage detection valve 102, which is provided in the fresh air line 26, when initiating the detection of the leakage, that is, at specified timing at which the engine 1 is under the low load (step S100). Then, the valve control unit 112 receives the pressure in the intake manifold 17, which is obtained after closing of the leakage detection valve 102, from the pressure sensor 108, and adjusts the opening degree of the PCV valve 104 in accordance with the pressure in the intake manifold 17 (step S102). More specifically, the valve control unit 112 reduces the opening degree of the PCV valve 104 as the negative pressure in the intake manifold 17 is increased, so as to retain the flow rate of the blow-by gas, which is delivered to the scavenging line 27, to be constant.

Next, the pressure sensor 106 starts measuring the pressure in the crank chamber 6 after the leakage detection valve 102 is closed (step S104). The pressure sensor 106 outputs the detection signal indicative of the measured pressure in the crank chamber 6 to the leakage determination unit 114.

Next, the leakage determination unit 114 extracts the pressure P1 in the crank chamber 6, which is obtained after the lapse of the specified time (for instance, 10 seconds) from closing of the leakage detection valve 102, from the detection signal received from the pressure sensor 106. Then, the leakage determination unit 114 determines whether the pressure P1 in the crank chamber 6 is at most equal to the threshold value P2, which is set in advance (step S106).

As a result, if the pressure P1 is at most equal to the threshold value P2 (YES in Step S106), the leakage determination unit 114 determines that the leakage occurs in none of the lines for constituting the PCV passage 32 (step S108), and terminates the leakage detection process.

On the other hand, if the pressure P1 is not at most equal to the threshold value P2 (NO in Step S106), the leakage determination unit 114 determines that the leakage occurs in any of the lines for constituting the PCV passage 32 (step S110). Then, the leakage determination unit 114 stores a specified malfunction code indicative of the occurrence of the leakage in the memory unit of the control device 110 (step S112) and terminates the leakage detection process.

The preferred implementation of the present invention has been described so far with reference to the accompanying drawings. However, it is needless to say that the present invention is not limited to such an implementation. It is apparent for those skilled in the art to be able to achieve various modification examples or correction examples within the scope of the claims, and it is understood that those naturally fall within the technical scope of the present invention.

For instance, in the above implementation, the description has been made on the example in which the leakage detection device 100 of the present invention is applied to the horizontally-opposed four-cylinder engine. However, the present invention is not limited thereto but can also be applied to a V engine or an inline engine. In addition, in the above implementation, the description has been made on the example in which the specified time for which the pressure sensor 106 measures the pressure in the crank chamber 6 is set as 10 seconds. However, this specified time is not limited to 10 seconds but any time can be set therefor.

In the above implementation, the description has been made on the example in which the pressure sensor 106 is attached to the crankcase 4 and the pressure sensor 106 measures the pressure in the crank chamber 6. However, a mounting position of the pressure sensor 106 is not limited thereto but may be any position in the fresh air line 26 or in the balance line 31, for instance. That is, the pressure sensor 106 only needs to be mounted at any position at which the pressure in the PCV passage 32 can be measured.

In the above implementation, the description has been made on the example in which the valve control unit 112 adjusts the opening degree of the PCV valve 104 in accordance with the pressure in the intake manifold 17. However, instead of the above, the valve control unit 112 may adjust the opening degree of the PCV valve 104 in accordance with the pressure in the crank chamber 6, which is measured by the pressure sensor 106.

In the above implementation, the description has been made on the example in which the specified malfunction code is stored in the memory unit of the control device 110 in the case where the leakage determination unit 114 determines that the leakage occurs in any of the lines for constituting the PCV passage 32. However, instead of the above, the leakage determination unit 114 may turn on a warning lamp that informs the occurrence of the leakage on a main panel in a driver's seat, so as to inform a driver of the occurrence of the leakage.

In the above implementation, the description has been made on the configuration that the leakage detection valve 102 is provided at the end of the fresh air line 26 on the side that is coupled to the intake passage 18. However, a mounting position of the leakage detection valve 102 is not limited thereto but may be in the middle of the fresh air line 26.

Figure 4:
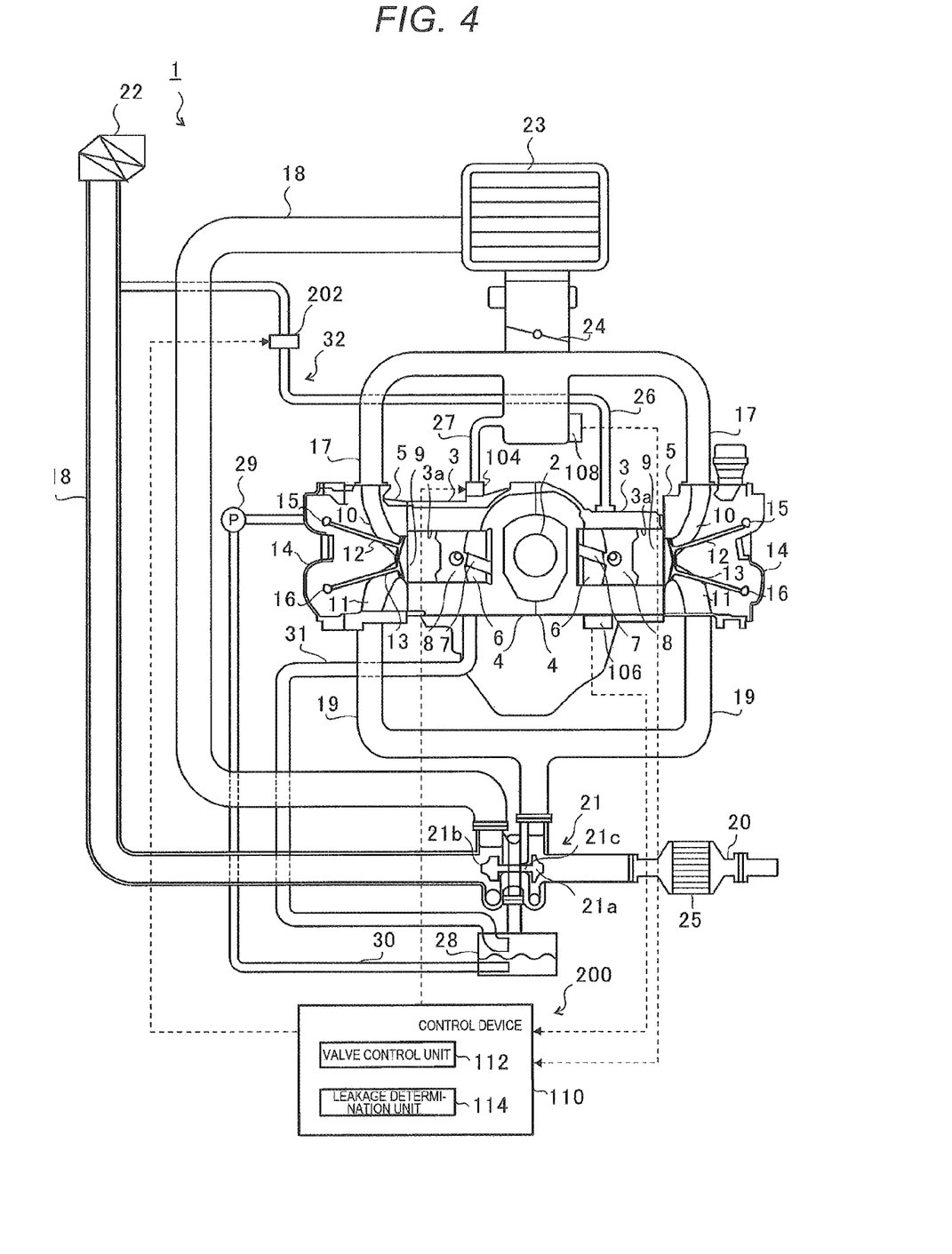
FIG. 4 is a schematic view of an engine that includes a leakage detection device according to a modified example.

For instance, in a leakage detection device 200 according to a modified example as illustrated in FIG. 4, a leakage detection valve 202 is provided in the middle of the fresh air line 26. In the leakage detection device 200, when the detection of the leakage is initiated, the valve control unit 112 closes the leakage detection valve 202, which is provided in the middle of the fresh air line 26. Also in this case, the flow of the fresh air that is introduced from the intake passage 18 into the crank chamber 6 via the fresh air line 26 is blocked. Thus, the leakage that occurs in any of the lines for constituting the PCV passage 32 can be detected in a similar manner to the above implementation.

In the above implementation, the description has been made on the leakage detection in the operating range of the natural aspiration where the supercharger 21 is not driven. However, also in the range of the supercharging operation where the supercharger 21 is driven, the leakage can also be detected in a similar manner to that in the operating range of the natural aspiration.

In the range of the supercharging operation, a portion of the intake passage 18 on the upstream side of the compressor 21b has the negative pressure. Due to this negative pressure, the blow-by gas flows through the fresh air line 26 in a direction of the solid arrows illustrated in FIG. 2B and is recirculated into the intake passage 18. In addition, in the range of the supercharging operation, a portion on a downstream side of the compressor 21b that includes the intake manifold 17 is pressurized. By opening the PCV valve 104 at this time, the pressure in the crank chamber 6 and the pressure in the PCV passage 32 are also increased.

When the pressure in the crank chamber 6 and the pressure in the PCV passage 32 are increased to certain extent, the valve control unit 112 closes the leakage detection valve 102. Thereafter, a state where the pressure in the crank chamber 6 is reduced to an atmospheric pressure side from the increased state is measured by the pressure sensor 106. At this time, in the case where the leakage occurs in any of the lines for constituting the PCV passage 32, the pressure in the crank chamber 6 is reduced to the vicinity of the atmospheric pressure at a faster pace than that in the case where the leakage does not occur.

In view of the above, the leakage determination unit 114 determines that the leakage occurs in the PCV passage 32 in the case where the pressure in the crank chamber 6 is reduced to be at most equal to a specified threshold value at a time point at which specified time (for instance, 5 seconds) elapses from closing of the leakage detection valve 102. A pressure value that is measured in the crank chamber 6 may be set as the threshold value in this case, the pressure value being measured at the time point at which at least the specified time elapses from closing of the leakage detection valve 102 in the case where the leakage occurs in the PCV passage 32. As described above, the leakage detection device 100 detects the leakage in both of the operating range of the natural aspiration and the range of the supercharging operation. In this way, an opportunity for detecting the leakage occurred in the PCV passage 32 can be broadened.

As it has been described so far, according to the present invention, the leakage that occurs in the PCV passage of the engine can be detected comprehensively.

Note that the supercharger 21 is not an essential configuration in the present invention and the present invention can also be applied to an engine in which the supercharger 21 is not mounted.

The present invention can be used for the leakage detection device for detecting the leakage that occurs in the PCV passage of the engine.

The invention claimed is:

1. A leakage detection device that detects leakage in a Positive Crankcase Ventilation (PCV) passage that includes a scavenging line that communicates between a crank chamber of an engine and a portion of an intake passage of the engine that is on a downstream side of a throttle valve, the leakage detection device comprising:
   a pressure measurement unit that measures pressure in the PCV passage;
   a first valve that opens/closes a fresh air line of the PCV passage, the fresh air line communicating between the crank chamber and a portion of the intake passage that is on an upstream side of the throttle valve;
   a second valve formed between the scavenging line and the crank chamber;
   a valve control unit that in a leakage detection process:
      closes the first valve to block a flow of fresh air into the crank chamber;
      adjusts an opening of the second valve so that a negative pressure in the crank chamber remains less than an amount predetermined as excessive; and
   a leakage determination unit that, after the closing of the first valve and the adjusting of the opening of the second valve, determines a presence or absence of leakage in the PCV passage on a basis of the pressure in the PCV passage.

2. The leakage detection device according to claim 1, wherein the first valve is provided at an end of the fresh air line on a side that is coupled to the intake passage.

3. The leakage detection device according to claim 1, wherein the second valve is capable of adjusting a flow rate of blow-by gas to be delivered from the crank chamber to the scavenging line, the flow rate being adjusted so that the negative pressure in the crank chamber remains less than the excessive amount.

4. The leakage detection device according to claim 2, wherein the second valve is capable of being adjusted to any of plural intermediate opening degrees, to be therefore capable of adjusting a flow rate of blow-by gas to be delivered from the crank chamber to the scavenging line, the flow rate being electronically adjusted by the valve control unit so that the negative pressure in the crank chamber remains less than the excessive amount.

5. The leakage detection device according to claim 3, wherein the valve control unit controls the opening degree of the second valve on a basis of the pressure measured by the pressure measurement unit and on a basis that the negative pressure in the crank chamber remains less than the excessive amount.

6. The leakage detection device according to claim 4, wherein the valve control unit controls the opening degree of the second valve on a basis of the pressure measured by the pressure measurement unit and on a basis that the negative pressure in the crank chamber remains less than the excessive amount.

7. The leakage detection device according to claim 3, an intake manifold pressure measurement unit that measures pressure in an intake manifold of the engine, wherein the valve control unit controls the opening degree of the second valve on a basis of the pressure measured by the intake manifold pressure measurement unit and on a basis that the negative pressure in the crank chamber remains less than the excessive amount.

8. The leakage detection device according to claim 4, further comprising:
an intake manifold pressure measurement unit that measures pressure in an intake manifold of the engine,
wherein the valve control unit controls the opening degree of the second valve on a basis of the pressure measured by the intake manifold pressure measurement unit and on a basis that the negative pressure in the crank chamber remains less than the excessive amount.

9. The leakage detection device according to claim 1, wherein the leakage determination unit determines that the leakage occurs in the PCV passage when the portion of the intake passage that is on the downstream side of the throttle valve has negative pressure and the pressure in the PCV passage does not become at most equal to a specified threshold value after a lapse of specified time from closing of the first valve.

10. The leakage detection device according to claim 2, wherein the leakage determination unit determines that the leakage occurs in the PCV passage when the portion of the intake passage that is on the downstream side of the throttle valve has negative pressure and the pressure in the PCV passage does not become at most equal to a specified threshold value after a lapse of specified time from closing of the first valve.

11. The leakage detection device according to claim 3, wherein the leakage determination unit determines that the leakage occurs in the PCV passage when the portion of the intake passage that is on the downstream side of the throttle valve has negative pressure and the pressure in the PCV passage does not become at most equal to a specified threshold value after a lapse of specified time from closing of the first valve.

12. The leakage detection device according to claim 4, wherein the leakage determination unit determines that the leakage occurs in the PCV passage when the portion of the intake passage that is on the downstream side of the throttle valve has negative pressure and the pressure in the PCV passage does not become at most equal to a specified threshold value after a lapse of specified time from closing of the first valve.

13. The leakage detection device according to claim 1, further comprising:
a compressor that supercharges air that flows into the intake passage on a downstream side of a portion of the intake passage that communicates with the fresh air line and on an upstream side of the throttle valve,
wherein the first valve is closed after the air, which flows into the intake passage, is supercharged by the compressor, and
the leakage determination unit determines that the leakage occurs in the PCV passage when the pressure in the PCV passage becomes at most equal to the specified threshold value at a time point at which the specified time elapses from closing of the first valve.

14. The leakage detection device according to claim 2, further comprising:
a compressor that supercharges air that flows into the intake passage on a downstream side of a portion of the intake passage that communicates with the fresh air line and on an upstream side of the throttle valve,
wherein the first valve is closed after the air, which flows into the intake passage, is supercharged by the compressor, and
the leakage determination unit determines that the leakage occurs in the PCV passage when the pressure in the PCV passage becomes at most equal to the specified threshold value at a time point at which the specified time elapses from closing of the first valve.

15. The leakage detection device according to claim 3, further comprising:
a compressor that supercharges air that flows into the intake passage on a downstream side of a portion of the intake passage that communicates with the fresh air line and on an upstream side of the throttle valve,
wherein the first valve is closed after the air, which flows into the intake passage, is supercharged by the compressor, and
the leakage determination unit determines that the leakage occurs in the PCV passage when the pressure in the PCV passage becomes at most equal to the specified threshold value at a time point at which the specified time elapses from closing of the first valve.

16. The leakage detection device according to claim 4, further comprising:
a compressor that supercharges air that flows into the intake passage on a downstream side of a portion of the intake passage that communicates with the fresh air line and on an upstream side of the throttle valve,
wherein the first valve is closed after the air, which flows into the intake passage, is supercharged by the compressor, and
the leakage determination unit determines that the leakage occurs in the PCV passage when the pressure in the PCV passage becomes at most equal to the specified threshold value at a time point at which the specified time elapses from closing of the first valve.

17. The leakage detection device of claim 1, wherein the PCV passage further comprises a balance line that communicates between the crank chamber of the engine and an oil catch tank so as to retain a pressure in the oil catch tank to be equal to the pressure in the crank chamber and prevents an excess negative pressure in the oil catch tank caused by a suction of oil by a scavenging pump.

18. The leakage detection device of claim 1, wherein the closing of the first valve causes the pressure in the PCV passage to become negative and the absence of leakage in the PCV passage is detected when the negative pressure gradually increases over a predetermined lapse of time to a predetermined value and the presence of leakage is detected when the negative pressure does not gradually increase over the predetermined lapse of time to the predetermined value.

19. A leakage detection system that detects leakage in a Positive Crankcase Ventilation (PCV) passage of an engine, the leakage detection system comprising:
  a valve control unit;
  a pressure measurement unit that measures a pressure in the PCV passage;
  a first valve that opens/closes a fresh air line of the PCV passage;
  a second valve capable of electronic control by the valve control unit of a flow rate of a blow-by gas to be delivered from a crank chamber of the engine to a scavenging line of the PCV passage; and
  a leakage determination unit that determines a presence or absence of leakage in the PCV passage on a basis of the pressure in the PCV passage at a time when the first valve closes compared to the pressure in the PCV passage after a predetermined lapse of time,
  wherein the scavenging line communicates between the crank chamber of the engine and a portion of an intake passage of the engine that is on a downstream side of a throttle valve, and the fresh air line communicates between the crank chamber and a portion of the intake passage that is on an upstream side of the throttle valve,
  wherein the PCV passage comprises a balance line that communicates between the crank chamber of the engine and an oil catch tank so as to retain a pressure in the oil catch tank to be equal to the pressure in the crank chamber and prevents an excess negative pressure in the oil catch tank caused by a suction of oil by a scavenging pump, and
  wherein the valve control unit closes the first valve to block a flow of fresh air into the crank chamber when the engine is under a low load and controls an opening of the second valve so as to maintain a flow rate of blow-by gas from the crank chamber to the scavenging line to be constant when the first valve is closed, in a manner that concurrently ensures that a negative pressure in the crank chamber remains less than an amount predetermined as excessive.

20. A method of detecting a leakage in a Positive Crankcase Ventilation (PCV) passage that at least includes a scavenging line that communicates between a crank chamber of an engine and a portion of an intake passage of the engine that is on a downstream side of a throttle valve, the leakage detection method comprising:
  closing a first valve in a fresh air line of the PCV passage to block a flow of fresh air into the crank chamber, the fresh air line communicating between the crank chamber and a portion of the intake passage that is on an upstream side of the throttle valve;
  opening an electronically-controlled Positive Crankcase Valve (PCV) valve formed between the scavenging line and the crank chamber;
  measuring an air pressure in the PCV passage while concurrently adjusting an opening setting of the PCV valve to control a negative pressure in the crank chamber to be less than an amount predetermined as excessive; and
  determining a presence or absence of leakage in the PCV passage on a basis of the pressure in the PCV passage at a time when the first valve is closed and the PCV valve is open.

* * * * *